H. DICKINSON AND G. A. W. HEPBURN.
STEREOSCOPIC PROJECTING APPARATUS.
APPLICATION FILED FEB. 21, 1920.
1,383,538.
Patented July 5, 1921.
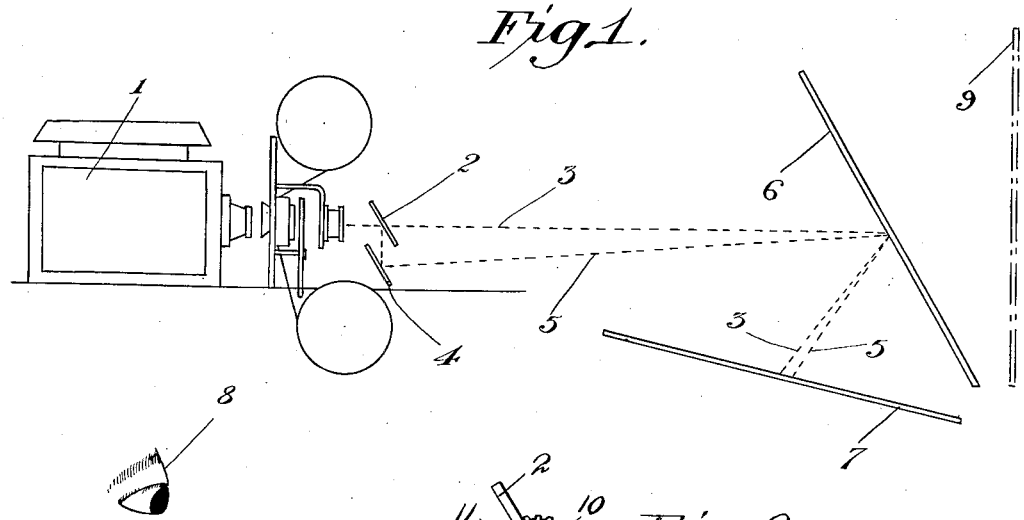
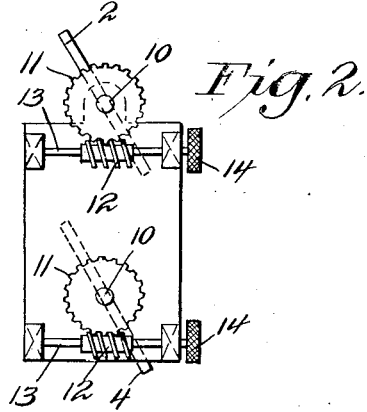
INVENTORS.
Herbert Dickinson.
George Anderson William Hepburn.
PER: Rayner &
ATTORNEYS.

UNITED STATES PATENT OFFICE.

HERBERT DICKINSON, OF NORWOOD, AND GEORGE ANDERSON WILLIAM HEPBURN, OF MAIDA HILL, ENGLAND.

STEREOSCOPIC PROJECTING APPARATUS.

1,383,538.     Specification of Letters Patent.     Patented July 5, 1921.

Application filed February 21, 1920. Serial No. 360,379.

*To all whom it may concern:*

Be it known that we, HERBERT DICKINSON and GEORGE ANDERSON WILLIAM HEPBURN, subjects of the King of Great Britain and Ireland, residing at, respectively, 2 Jasper road, Norwood, in the county of Surrey, England, and 44 Chippenham road, Maida Hill, in the county of Middlesex, England, have invented a certain new and useful Improvement in Stereoscopic Projecting Apparatus, of which the following is a specification.

This invention relates to an arrangement of means for obtaining stereoscopic or plastic effects with pictures produced by cinematography or like projecting apparatus and employing the ordinary film or slide as at present used for flat pictures. Hitherto it has been necessary to use specially prepared films such as figures taken on a black background, the background being supplied by fixed scenery or in some cases by a secondary projecting lantern. In other cases two actual sterescopic projections have been made upon the same screen, the pictures being viewed through an apparatus held separately before the eyes of each onlooker.

Other methods have also been used but have been found lacking in one respect or another, and have not been fit for general use.

According to the present invention the single picture is split up so as to produce two images upon the screen. These two images are identical but are arranged upon the screen a small distance apart or slightly out of register; the extent of this lack of register is sufficiently small to not be visible to the onlooker, while the effect produced is to give a stereoscopic or plastic effect to the picture, the edges of the various objects thereon being shaded so as to produce a roundness or solidity to the various articles. The effect is considerably enhanced by the natural mental tendency when viewing the objects to reproduce on the mind the real shape of the objects of which the onlooker is well aware. The result is that the picture appears solid and a substantial sterescopic effect is produced. There is no blurring and all lines come out sharp, shutter flicker is eliminated and there is entire absence of strain to the eyesight which is apparent with ordinary cinematograph pictures.

In carrying out our invention we employ projecting apparatus of any convenient type, and by means of suitable reflecting or semi reflecting surfaces rays of light may be split up so as to produce two images upon the screen, the two images being arranged slightly out of register. We prefer to employ a transparent reflector placed at an angle to the path of the rays of light coming from the projector. The majority of the light passes directly through this reflector and produces the main image upon the screen. A portion of the light is, however, reflected from the surface of the transparent reflector on to a secondary reflector and thence to the screen in a position slightly out of register with the main image.

The screen upon which the pictures are viewed is preferably placed below or above the line of projection and the rays of light are thrown by the projector on to an inclined mirror or other reflector and thence to the screen; the onlookers viewing the image upon the screen through the reflector.

Any suitable combination of optical apparatus such as mirrors, screens or prisms may be employed to deflect or reflect the rays of light so as to produce the two images in the desired relative position and of the desired relative intensity of illumination.

In order that our invention may be more readily understood reference is had to the accompanying drawing in which Figure 1 shows a diagrammatic illustration of apparatus for carrying out our invention, and Fig. 2 shows a detail hereinafter referred to.

Referring to the drawing 1 represents any suitable type of projecting apparatus or lantern for projecting cinematograph or other pictures upon a screen. Mounted in front of the lantern 1 is a transparent reflector 2 which may consist of a sheet of plate glass placed at a suitable angle to the rays of light 3 issuing from the projector 1. This reflector 2 is of such a nature as to allow the greater proportion of the ray of light 3 to pass through it while a small proportion is deflected on to the inclined mirror or prism 4 and from thence is reflected in the ray 5. The angles of the reflector 2 and reflector 4 may be made adjustable so as to regulate the position of the two images produced as shown diagrammatically in Fig. 2. It will be seen that the reflectors 2 and 4 are each mounted on a horizontal spindle 10 one end of which carries a toothed wheel 11 meshing with a worm carried by a spindle 13 provided at one end with an operating handle 14 or other suitable means, whereby the angle of the reflectors may be easily and quickly adjusted to fine limits. The two rays 3 and 5 are reflected from the surface of the mirror or other reflector 6 on to the screen 7 so as to produce two images thereon. These two images are identical and are arranged close together side by side and their relative positions may be readily adjusted by altering the angles of the adjustable reflector 2 and reflector 4.

These two images produced upon the screen 7 are viewed by an onlooker from the position 8 through the mirror 6 so as to produce the effect of a picture viewed upon an imaginary screen at the position 9. If desired the reflector 6 may be omitted and the rays of light for producing two pictures side by side may be transmitted direct to a screen placed in the position of the imaginary screen, illustrated by the dotted lines at 9.

Any suitable combination of screens, reflectors, prisms and lenses may be employed for splitting up the single image produced by the projector 1 into two images produced upon the screen at a small distance apart and of any desired relative intensity of illumination.

What we claim as our invention and desire to obtain by Letters Patent is:—

1. In stereoscopic projection apparatus, a projector, a transparent reflector which permits a portion of the light to pass to produce one image on the screen, a second reflecting surface onto which some of the light is reflected to produce a second image and a screen upon which both the images are projected so as to be viewed side by side and slightly out of register.

2. In stereoscopic projection apparatus, a projector, a transparent reflector which permits a portion of the light to pass to produce one image on the screen, a second reflecting surface onto which some of the light is reflected to produce a second image and a screen upon which both the images are projected so as to be viewed side by side and slightly out of register, and means for adjusting the angle of the reflectors.

3. In stereoscopic projection apparatus, a projector, a transparent reflector which permits a portion of the light to pass to produce one image on the screen, a second reflecting surface onto which some of the light is reflected to produce a second image and a screen upon which both the images are projected so as to be viewed side by side and slightly out of register, and an inclined mirror through which the images projected upon the screen are viewed by the onlooker.

4. In stereoscopic projection apparatus, a projector, a transparent reflector which permits a portion of the light to pass to produce one image on the screen, a second reflecting surface onto which some of the light is reflected to produce a second image and a screen upon which both the images are projected so as to be viewed side by side and slightly out of register, and means for adjusting the angle of the reflectors, and an inclined mirror through which the images projected upon the screen are viewed by the onlooker.

5. In stereoscopic projection apparatus, a projector, a transparent reflector, placed in front of the lens of the projector, which permits a portion of the light to pass to produce one image on the screen, a second reflecting surface onto which some of the light is reflected to produce a second image and a screen upon which both the images are projected so as to be viewed side by side and slightly out of register.

6. In stereoscopic projection apparatus, a projection, a transparent reflector placed in front of the lens of the projector, which permits a portion of the light to pass to produce one image on the screen, a second reflecting surface onto which some of the light is reflected to produce a second image and a screen upon which both the images are projected so as to be viewed side by side and slightly out of register, and means for adjusting the angle of the reflectors.

7. In stereoscopic projection apparatus, a projector, a transparent reflector, placed in front of the lens of the projector, which permits a portion of the light to pass to produce one image on the screen, a second reflecting surface onto which some of the light is reflected to produce a second image and a screen upon which both the images are projected so as to be viewed side by side and slightly out of register, and an inclined mirror through which the images projected upon the screen are viewed by the onlooker.

8. In stereoscopic projection apparatus, a projector, a transparent reflector, placed in front of the lens of the projector, which permits a portion of the light to pass to produce one image on the screen, a second reflecting surface on to which some of the light is reflected to produce a second image and a screen upon which both the images are projected so as to be viewed side by side and slightly out of register, and means for adjusting the angle of the reflectors, and an inclined mirror through which the images projected upon the screen are viewed by the onlooker.

HERBERT DICKINSON.
GEORGE ANDERSON WILLIAM HEPBURN.